(12) United States Patent
Jung et al.

(10) Patent No.: US 9,363,341 B2
(45) Date of Patent: Jun. 7, 2016

(54) MOBILE TERMINAL EQUIPPED WITH AN ANTENNA TRANSMITTING AND RECEIVING WIRELESS COMMUNICATION

(71) Applicant: LG ELECTRONICS INC., Seoul (KR)

(72) Inventors: Byungwoon Jung, Seoul (KR); Jaewoo Lee, Seoul (KR); Sungjung Rho, Seoul (KR); Changwon Yun, Seoul (KR); Daeyong Kwak, Seoul (KR); Sungjoon Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/693,539

(22) Filed: Apr. 22, 2015

(65) Prior Publication Data
US 2016/0088130 A1    Mar. 24, 2016

(30) Foreign Application Priority Data
Sep. 19, 2014  (KR) .......................... 10-2014-0125062

(51) Int. Cl.
*H04M 1/02*    (2006.01)
(52) U.S. Cl.
CPC ..................................... *H04M 1/026* (2013.01)
(58) Field of Classification Search
CPC ....... H04M 1/0214; H04M 1/23; H04M 1/03; H04M 1/3833
USPC ........................ 455/550.1, 575.1, 575.7, 90.3
See application file for complete search history.

(56) References Cited

U.S. PATENT DOCUMENTS

| | | | |
|---|---|---|---|
| 2005/0195119 A1 | 9/2005 | Gaucher et al. | |
| 2008/0150815 A1 | 6/2008 | Nakahata et al. | |
| 2008/0165067 A1 | 7/2008 | Kim | |
| 2012/0274532 A1 | 11/2012 | Kurashima et al. | |
| 2013/0069842 A1 | 3/2013 | Lee et al. | |
| 2013/0234911 A1 | 9/2013 | Lee | |

FOREIGN PATENT DOCUMENTS

| | | |
|---|---|---|
| EP | 1 437 794 A1 | 7/2004 |
| JP | 2012-85262 A | 4/2012 |

*Primary Examiner* — Sam Bhattacharya
(74) *Attorney, Agent, or Firm* — Birch, Stewart, Kolasch & Birch, LLP

(57) ABSTRACT

According to the present invention, a mobile terminal includes a main body including a front side with which a display unit is combined, a first antenna mounted on the main body, extended in a first direction and including a first slot of which one end is closed and another end is opened, a second antenna mounted on the main body, extended in a second direction corresponding to a direction opposite to the direction to which the first slot is extended and including a second slot of which one end is closed and another end is opened, a power supply unit mounted in the inside of the main body, a first feeder configured to supply power to the first antenna from the power supply unit and a second feeder configured to supply power to the second antenna from the power supply unit.

19 Claims, 18 Drawing Sheets

(a)

(b)

MOBILE TERMINAL EQUIPPED WITH AN ANTENNA TRANSMITTING AND RECEIVING WIRELESS COMMUNICATION

This application claims priority to Korean Patent Application No. 10-2014-0125062 filed on Sep. 19, 2014 in Korea, the entire contents of which is hereby incorporated by reference in its entirety.

BACKGROUND OF THE INVENTION

1. Field of the Invention

The present invention relates to a mobile terminal equipped with an antenna transmitting and receiving wireless communication.

2. Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Although a single antenna is mainly used in a legacy mobile communication system, a type of an antenna is diversifying as a function of the antenna is diversified. A plurality of antennas are installed for wireless communication of various forms including not only LTE communication for phone call and data communication, 2G, 3G communication but also satellite communication, short-range wireless communication such as WIFI, NFC, Bluetooth, DMB and the like.

Since antennas transmit and receive an electromagnetic wave, it may interfere with each other. In particular, if a metallic member is positioned at the inside or outside of a mobile terminal, a signal is influenced by the metallic member. Hence, it is very important to design an antenna capable of minimizing interference from a surrounding metal or an antenna.

SUMMARY OF THE INVENTION

Accordingly, the present invention is directed to an apparatus and method thereof that substantially obviate one or more problems due to limitations and disadvantages of the related art.

When a mobile terminal includes a metal part, an object of the present invention is to provide a mobile terminal capable of preventing performance of an antenna from being degraded by the metal part.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a main body including a front side with which a display unit is combined, a first antenna mounted on the main body, including a first slot of which first end is opened and second end is closed, a second antenna mounted on the main body, including a second slot of which one end is closed and another end is opened, a power supply unit mounted in the inside of the main body, a first feeder configured to supply power to the first antenna from the power supply unit and a second feeder configured to supply power to the second antenna from the power supply unit.

The mobile terminal further includes a metal plate mounted on the main body, a connection unit coupled to the one side of the main body, a first conductive strip extended from the connection unit in a first direction in a manner of being separated from the metal plate with a prescribed space, and a second conductive strip extended from the connection unit in a direction opposite to the first conductive strip and positioned in a manner of being separated from the metal plate with a prescribed space. In this case, the first slot is defined by the first conductive strip, the connection unit and the metal plate and the second slot is defined by the second conductive strip and the space between the connection unit and the metal plate.

The metal plate is positioned at a rear side of the display unit and can be configured by a part of a middle frame supporting the display unit.

The metal plate, the connecting unit, the first conductive strip and the second conductive strip can be integrated with each other.

The middle frame can further include an injected material integrating the metal plate, the first conductive strip and the second conductive strip with each other in a manner of using an insert injecting scheme on a circumstance of the metal plate, the first conductive strip and the second conductive strip.

The first conductive strip and the second conductive strip may use a metal deco exposed to an exterior of the main body of the mobile terminal.

The first slot and the second slot can be filled with an electric insulation material.

The first conductive strip and the second conductive strip correspond to a strip board including a metallic material and the connection unit can include a screw configured to connect the strip board and a middle frame with each other.

The mobile terminal can further include a main board positioned at a rear side of the middle frame and an external terminal connection unit combined with a rear side of the main board. In this case, at least a part of the first conductive strip and the second conductive strip can be positioned at a rear side of the external terminal connection unit.

The mobile terminal can further include a stub extended in a manner of being connected with at least one of the first conductive strip and the second conductive strip.

The stub can be positioned at a plane different from the first conductive strip or the second conductive strip.

The main body includes a front case covering a front side and a rear case covering a rear side and the stub is formed on the rear side of the rear case and can be connected with at least one of the first conductive strip and the second conductive strip by penetrating the rear case.

The mobile terminal can further include a screw connected with the stub and combined with the first conductive strip or the second conductive strip by penetrating the rear case.

The first direction and the second direction are horizontal direction of the main body and the stub can be extended in a vertical direction along a side of the main body.

The stub is arranged in a manner of being separated from the metal plate and the first slot and the second slot can be extended in accordance with a length of the stub.

The first feeder is connected with the first conductive strip and a first stub extended from the first conductive strip and may be able to supply power to the first conductive strip and the stub.

The mobile terminal can further include a first coupling pattern connected with the first conductive strip and extended in the second direction and a second coupling pattern positioned in the vicinity of the first antenna, connected with the power supply unit and extended in the first direction. In this case, another end of the first coupling pattern and another end of the second coupling pattern can be closely arranged in a manner of facing with each other.

The mobile terminal can further include a switch configured to be turned on and off in a manner of being connected with the first conductive strip and the switch configured to change a flow of an electric current flowing through the first antenna.

The mobile terminal can further include a third coupling pattern extended from the second conductive strip and a fourth coupling pattern positioned in the vicinity of the second antenna and extended from the power supply unit.

A length of the first slot may be longer than a length of the second slot.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Figure 1A:
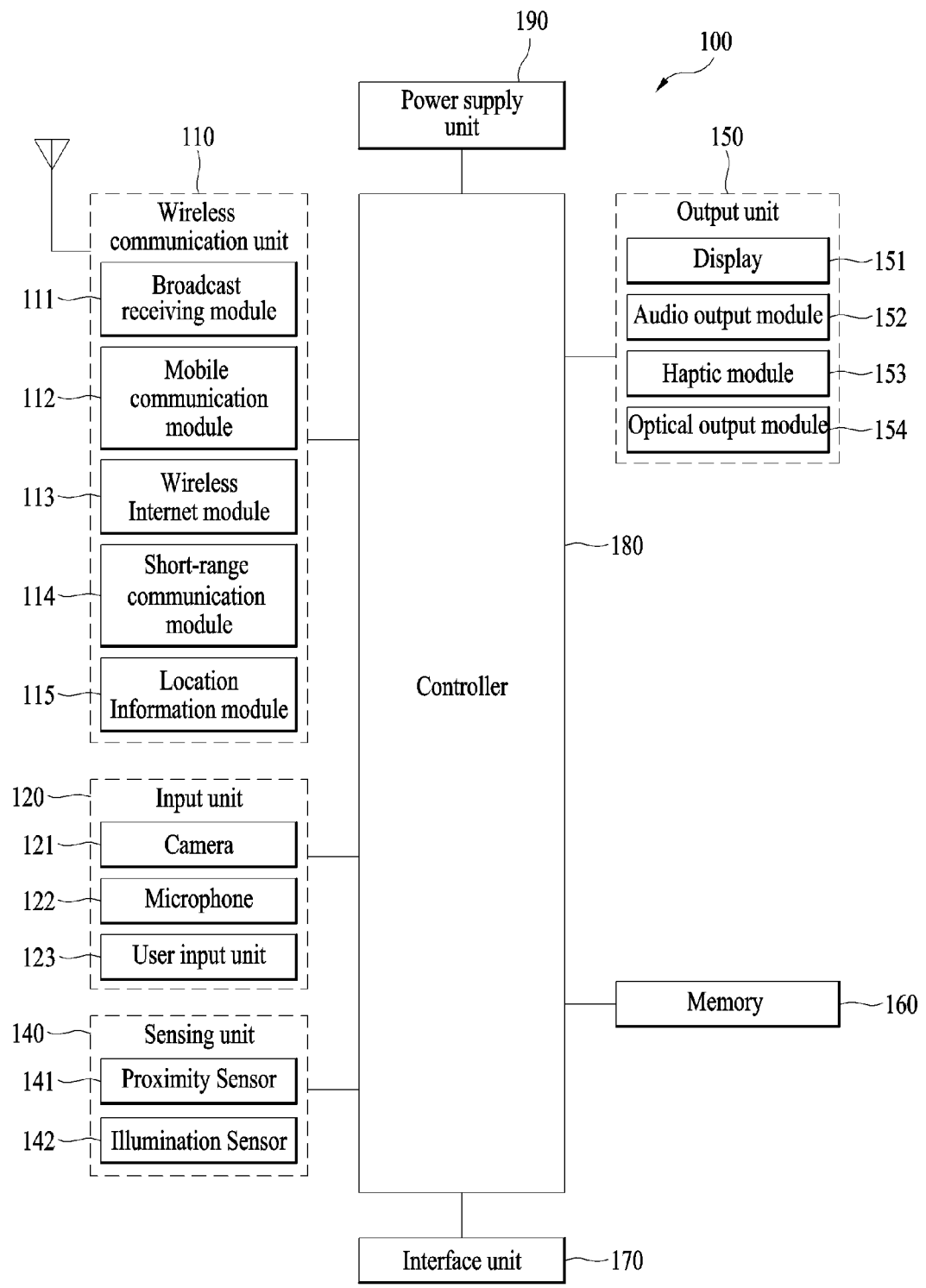
FIG. 1A is a block diagram illustrating a mobile terminal in accordance with the present disclosure.
Figure 1B:
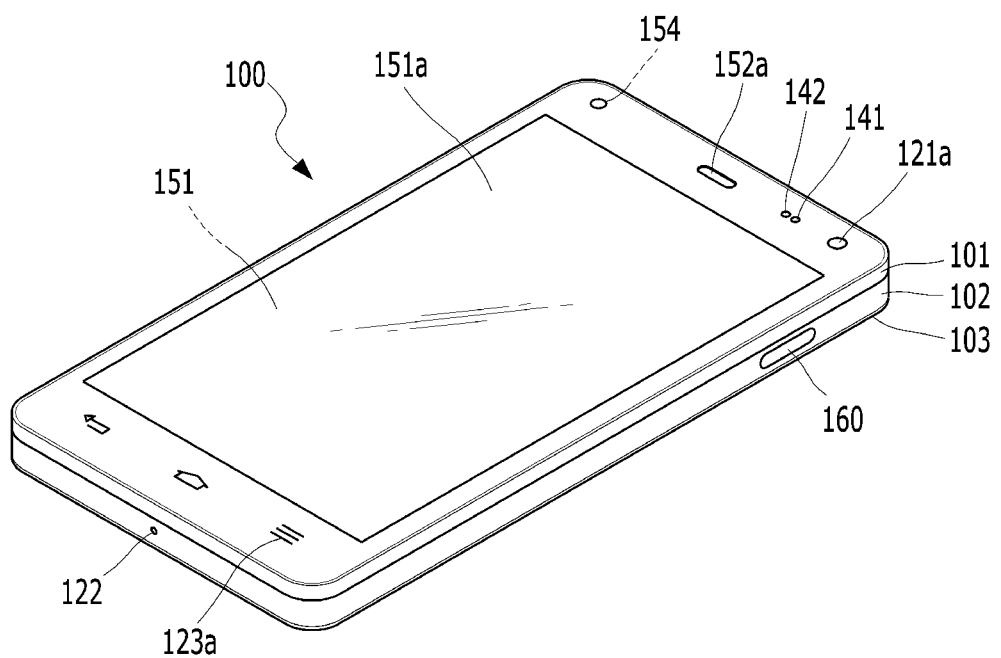
FIGS. 1B and 1C are conceptual views of one example of the mobile terminal, viewed from different directions.
Figure 1C:
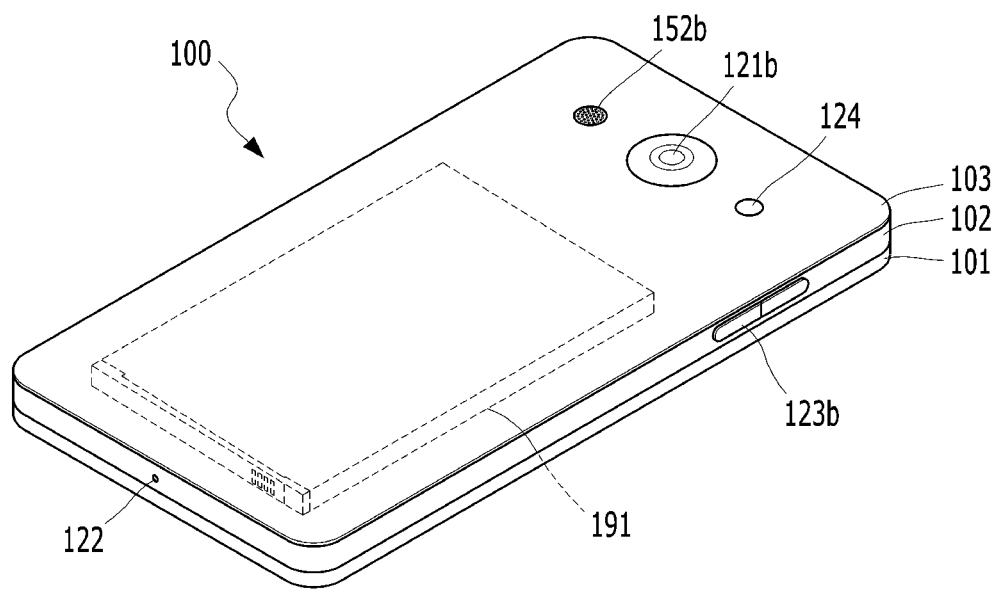

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
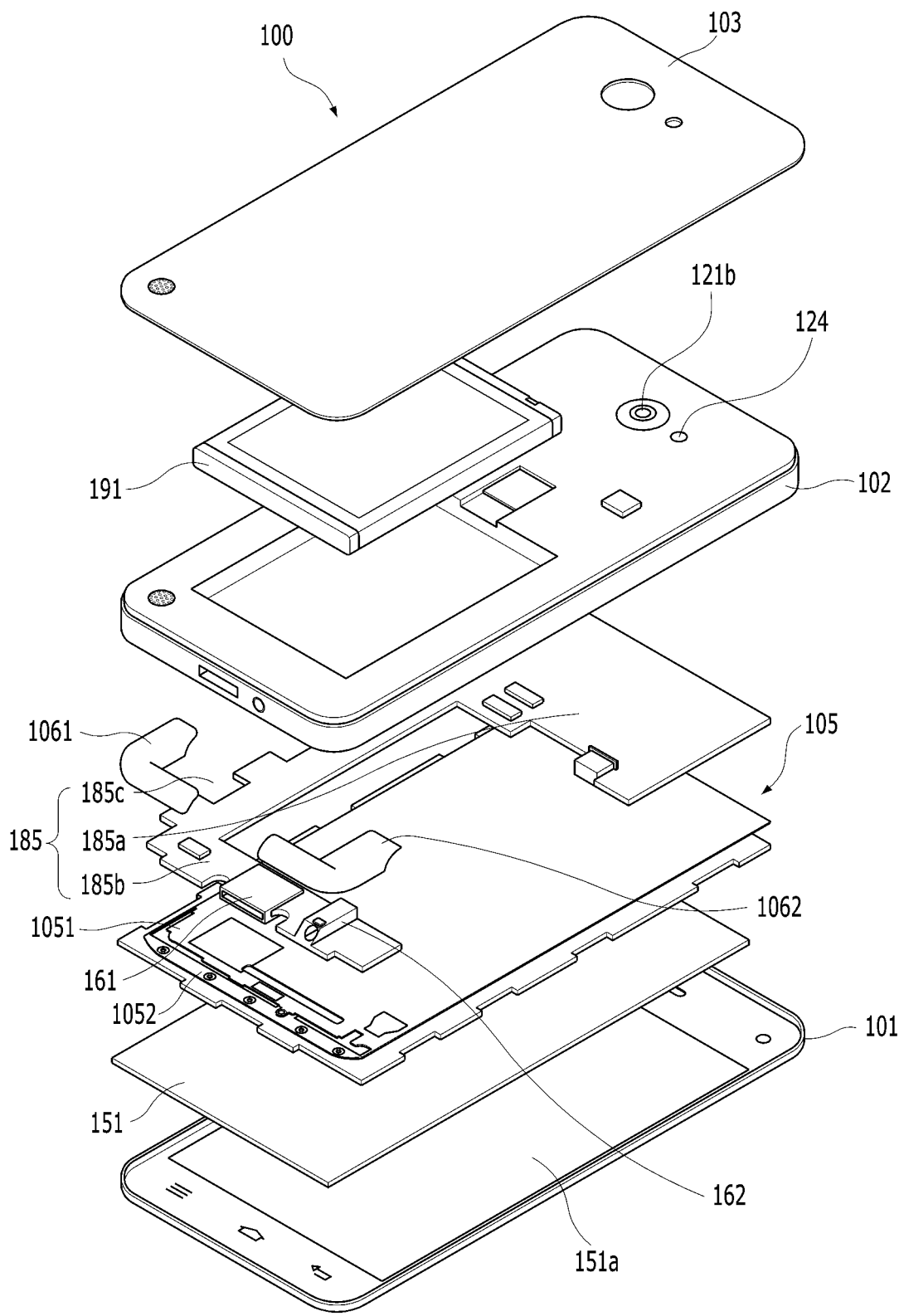
FIG. 2 is an exploded perspective diagram for an example of a mobile terminal according to the present invention.

FIG. 2 is an exploded perspective diagram for an example of a mobile terminal 100 according to the present invention. Referring to FIG. 2, the mobile terminal 100 includes the display unit 151 and a window 151a situating at the front side of the display unit 151. Since an edge part of the window 151a is combined with an edge of the front case 101, it may be able to fix the display unit 151.

In order to support the display unit 151, install electronic elements and provide hardness to the mobile terminal 100, a middle frame 105 can be interposed between the front case 101 and a rear case 102. The display unit 151 is positioned at the front of the middle frame 105. A camera 121a, an audio output module 152a, a user input unit 131a and the like are arranged at an edge of a front side of the middle frame 105.

A battery mounting unit on which a main board 185 and a battery are mounted is installed in a rear side of the middle frame 105. An antenna for wireless communication, a USB port 161 for connecting an external device, an interface 160 such as an ear jack 162 and the like can be arranged at the rear side of the middle frame 105.

The middle frame 105 forms a first frame 1051 using such a metallic material as magnesium for hardness and a second frame 1055 is formed in a manner of covering an edge of the first frame 1051 with resins, which is an electric insulation material, via insert injection. The first frame 1051 provides hardness to the mobile terminal 100 and functions as a ground in a manner of being connected with such an electronic part as the main board 185 and an antenna.

Since the second frame 1055 is formed using injection molding, shape degree of freedom is high compared to the first frame 1051 made of a metal. In case of a member capable of easily forming a bump and not contacted with the first frame 1051 electrically, the member can be installed in the second frame 1055.

A main board 185 and a battery 191 are arranged at the rear side of the middle frame 105. Since the battery 191 is thicker than any other member, the main board 185, an interface unit, a card slot in which a USIM card or a memory card is installed, a camera of a rear side, an audio output module of the rear side and the like can be arranged in a manner of avoiding a part in which the batter 191 is installed to minimize overlap of the battery 191 and a different member.

In order to electrically connect a part arranged at an upper side with a part arranged at a bottom part on the basis of the battery 191, it may be able to configure a first main board 185a arranged at the upper side, a second main board 185b arranged at the bottom side and a connection board 185c connecting the first main board 185a and the second main board 185b with each other. Since the connection board 185c corresponds to a signal connection path between the two boards and is not designed to install a different part in the connection board, the connection board can be made up of a flexible printed circuit board of which bearing power is not strong.

An integrated circuit (IC) for various operations, which includes an AL (application processor) chip driving the mobile terminal 100, is installed in the first main board 185a arranged at the upper part. And, a camera, a rear side input unit and the like can also be arranged at the first main board. Such an interface as a USB port 161 and an ear jack 162, a speaker and the like can be arranged at the bottom part.

Antennas for wireless communication are arranged at an upper part and a bottom part of the mobile terminal 100. As a function of the mobile terminal 100 is diversifying, various forms of an antenna can be used. Hence, antennas can be installed in the upper part and the bottom part of the mobile terminal. Since a frequency band transmitted and received by each antenna and a scheme of each antenna is different from each other, each antenna operates independently. Yet, since each antenna emits an electromagnetic wave, there exists a problem of interference interfering with each other.

If interference occurs, a transmission and reception rate of a radio signal is reduced sharply. Hence, it is preferable to arrange antennas in a manner of being separated from each other. And, since a side of the mobile terminal corresponds to a part held by a user when the mobile terminal is in use, a transmission and reception rate of a radio signal may be reduced by a hand of the user. Hence, antennas can be arranged at the upper part and the bottom part of the mobile terminal in a manner of being distributed.

An antenna used for the mobile terminal 100 can be variously used for a phone call and data communication. A main antenna configured to perform wireless communication with a base station of the mobile terminal 100 should be able to perform wireless communication using various communication schemes such as 2G, 3G and LTE of various bands.

The main antenna can be positioned at one side (bottom side in the present embodiment) of the mobile terminal 100 and a sub antenna can be positioned at another side of the mobile terminal 100 to supplement a function of the main antenna. And, it is necessary to have an antenna for short-range wireless communication such as Bluetooth and WIFI and a GPS antenna for communication between a GPS (global positioning system) and a satellite is also installed in the mobile terminal.

Each antenna is different from each other according to a wireless communication scheme. In particular, wireless communication communicated with a base station of a communication company, which is in charge of the main antenna and the sub antenna, transmits and receives a signal according to a regulation different from each other depending on a communication company or a country. Moreover, one communication company transmits and receives a signal via various frequency bands. If wireless communication does not work on a specific frequency band according to a region or a situation, in order to enable the wireless communication to be performed on a different frequency, a broadband antenna is used to enable a signal to be transmitted and received on a broadband frequency.

Yet, as a size of the mobile terminal 100 has been reduced and a distance between parts has decreased, an impact caused by a part in the vicinity of an antenna increases. In particular, a monopole antenna is usually used for a terminal and the monopole antenna considerably affects a part in the vicinity of the monopole antenna.

Hence, the mobile terminal according to the present invention intends to minimize an impact from a surrounding device using a slot antenna. The slot antenna corresponds to an antenna capable of performing wireless communication in a manner that electricity is provided to a conductor in which a long and thin opening is formed and a radio wave is emitted from the opening by an electric current spread on a surface of the conductor.

A general slot antenna operates as an emitter of a radio wave in a manner that a slot is formed on a wall of a wave guide, a surface of a conductor of a cylinder form or a plane conductor plate and electricity is provided to a part in which the slot is formed to make an electric field to be formed in the slot. The slot antenna should have a length of minimum $\lambda/2$ of a transmitting and receiving frequency and there is a limit on reducing a slot length. If an open slot antenna of which one side is opened is used in a manner of improving a closed antenna of which both sides are closed, a slot length (D) becomes a length sufficient enough to use by a length of $\lambda/4$. By doing so, a size of an antenna slot can be reduced to a half.

Figure 3:
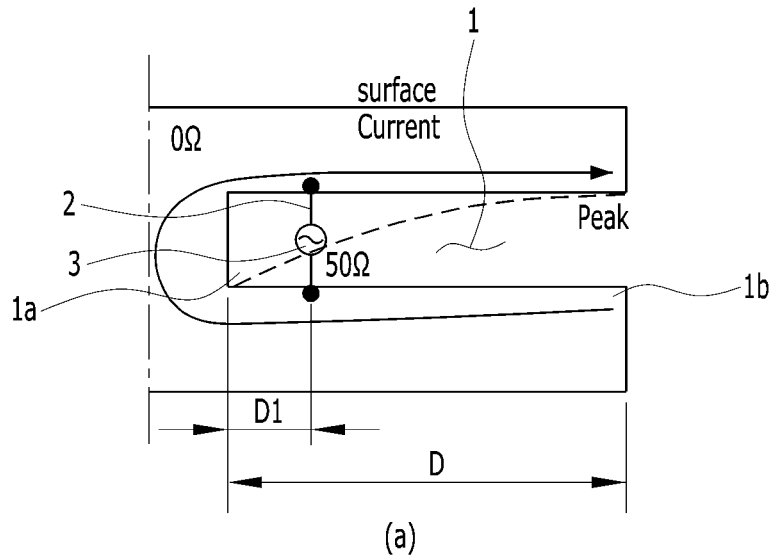
FIG. 3 is a diagram for explaining a slot antenna of a mobile terminal according to the present invention.
Figure 3:
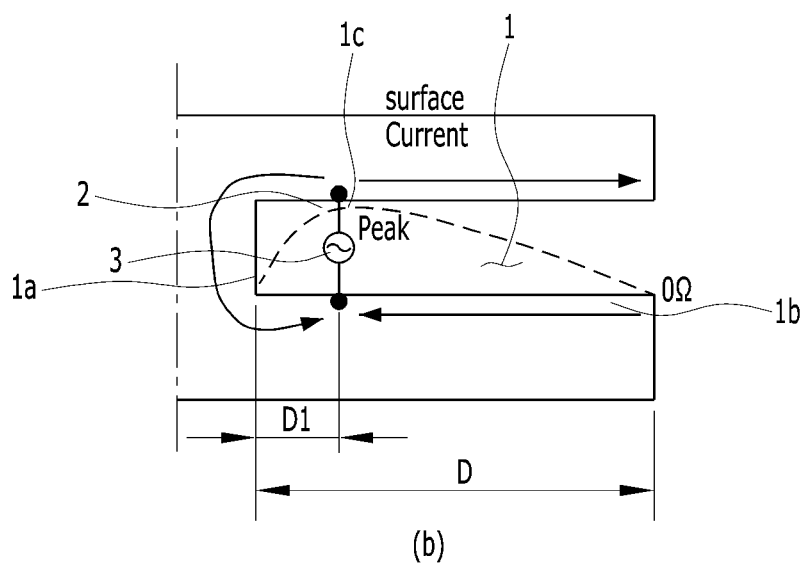

FIG. 3 is a conceptual diagram for explaining a general slot antenna. FIG. 3 (a) shows a relation between impedance and an electric current in case that a slot antenna of which one side is opened emits a radio wave of a first frequency band. In this case, a feeder 2 providing electricity is connected with the slot antenna at a D1 distance from a closed part 1a of the slot 1.

A dotted line indicates a size of the impedance and an arrow indicates an electric current flowing along the slot 1. A length of the slot 1 has a length corresponding to $\lambda/4$ of a center frequency wavelength of a first frequency band. A maximum value of the impedance emitting a radio wave has a value more or less than 377Ω (ohm) and a maximum impedance appears at an opened end 1b of the slot 1.

If impedance of the feeder 2 connected with a power feeding unit 3 is configured by a prescribed value (e.g., 50Ω) and a position (D1) of the feeder 2 connected with the slot 1 is adjusted, it is able to control the maximum impedance to be outputted from the end of the slot. This is called impedance matching.

If case of performing the impedance matching, a transmission and reception rate of a signal of a specific frequency band is rapidly enhanced compared to a different frequency band. In this case, a specific frequency of which a reception rate is high is called a resonant frequency.

FIG. 3 (b) shows a relation between impedance and an electric current in case that the slot antenna shown in FIG. 3 (a) emits a radio wave in a second frequency band. In this case, a length of the slot 1 has a length corresponding to $\lambda/2$ of a center frequency wavelength of the second frequency band. In particular, a wavelength of the second frequency band corresponds to a high frequency band (high band) of which the wavelength is shorter than a wavelength of the first frequency band and the first frequency band corresponds to a low frequency band (low band) of which a wavelength is relatively long.

Since $\lambda/4$ point of a wavelength is positioned at a center part of a slot 1 instead of an end of the slot 1, an impedance maximum value is formed at the center part of the slot 1. Hence, about 300Ω impedance appears at a part at which a feeder 211/212/215 is positioned and the impedance is not matched with impedance of the feeder 211/212/215. Hence, it may have a problem that an antenna reception rate of a high frequency band is degraded.

For this reason, a slot antenna has been mainly used for processing a radio signal of a single frequency band and it has been difficult to process radio signals of a plurality of frequency bands. A mobile communication provide a service using frequency bands including 800 MHz, 900 MHz, 1.8 GHz, 2.1 GHz and 2.6 GHz. A frequency band used for providing a service is little bit different from each other depending on a communication company and a different frequency band can be used according to a country.

In order to provide a mobile terminal capable of being applied to various communication companies and the mobile terminal usable in abroad, it is necessary to have an antenna usable for mobile communication services provided by various frequency bands. Hence, it is difficult to apply a slot antenna.

Figure 4:
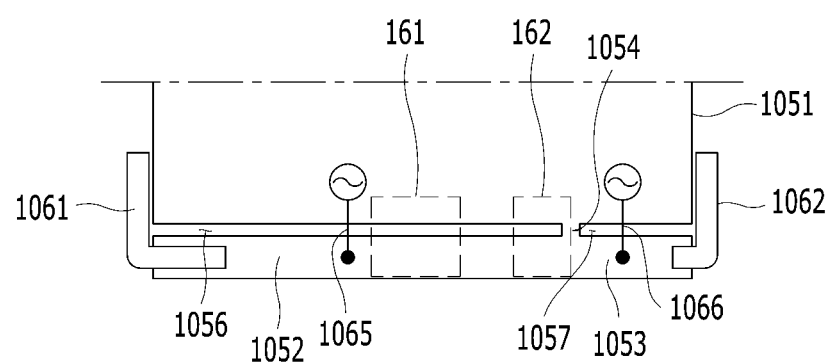
FIG. 4 is a conceptual diagram for a schematic configuration of an antenna of a mobile terminal according to the present invention.

FIG. 4 is a conceptual diagram for a schematic configuration of an antenna of a mobile terminal 100 according to the present invention. In order to solve the aforementioned problem and improve performance of an antenna, an antenna can be configured by two slots 1056/1057 transmitting and receiving signals in a manner of dividing the signals into a signal of a low frequency bandwidth (low band) and a signal of a middle frequency bandwidth (Mid band).

Referring to FIG. 4, FIG. 4 shows a metal plate 1051, a first conductive strip 1052, a second conductive strip 1053, a connection unit 1054, a first feeder 1065, a second feeder 1066, a first stub 1061 and a second stub 1062.

A slot antenna according to the present invention consists of a first antenna 116 including a first slot 1056 formed by a metal plate 1051, a connection unit 1054 and a first conductive strip 1052 and a second antenna 117 including a second slot 1057 formed by the metal plate 1051, the connection unit 1054 and a second conductive strip 1053 in a manner of being surrounded.

Since the first slot 1056 and the second slot 1057 are opened to a direction opposite to each other, respectively, an emitting direction is different from each other and mutual interference is less. If the two slots are formed in a manner of being different from each other in length, the two slots can be respectively used for wireless communication of frequencies different from each other. The first slot 1056 of a longer length emits a signal of a low frequency bandwidth (low band) and the second slot 1057 of a shorter length emits a signal of a middle frequency bandwidth (Mid band).

Since a mobile terminal 100 is restricted in size, a size of a conductive strip 1052 is restricted as well. Hence, since a length of the first slot 1056, which is formed by the metal plate 1051, the connection unit 1054 and the first conductive strip 1052, is restricted, it may further include a first stub 1061 configured to extend the first slot 1056 to cause resonance with a frequency intended to be emitted by the first slot 1056.

Figure 5:
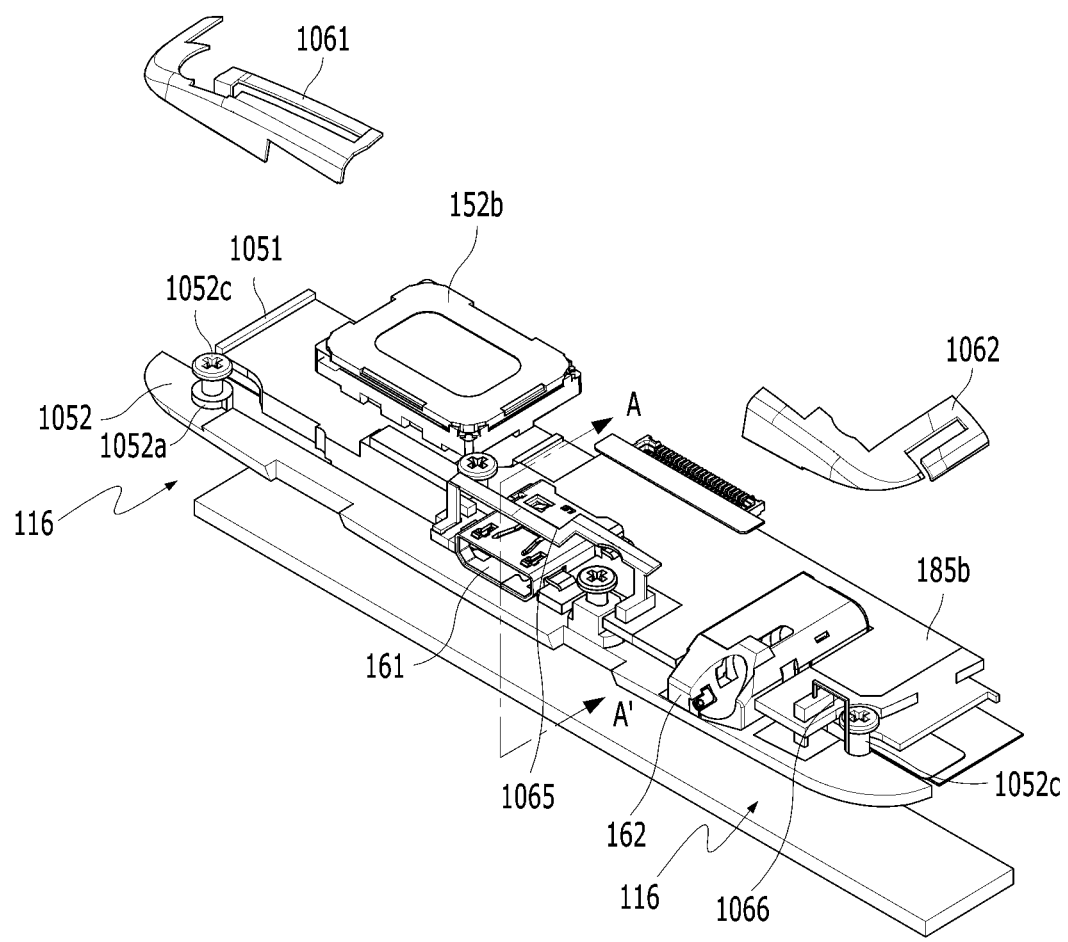
FIG. 5 is a perspective diagram for an example of a state that a middle frame and a main board of a mobile terminal are combined with each other according to the present invention.

Similar to the first slot 1056, the second slot 1057 emitting a signal of a high frequency bandwidth can also include a second stub 1062 to sufficiently secure a slot length of a slot antenna causing resonance in the high frequency bandwidth In the following, the present invention is explained with reference to detail embodiments of FIG. 5 to FIG. 8. FIG. 5 is a perspective diagram for an example of a state that a middle frame 105 and a main board of a mobile terminal 100 are combined with each other according to the present invention. In the present embodiment, a metal plate 1051 is positioned at a rear side of a display unit 151 and may be able to use a first frame of a middle frame 105 supporting parts installed in the display unit 151 and the mobile terminal 100. Besides the middle frame 105, if a case made up of a metallic material is applied, the case may become the metal plate 1051.

According to the present embodiment, the first conductive strip 1052 and the second conductive strip 1053 are integrated with each other on the middle frame 105. In particular, the first conductive strip 1052 and the second conductive strip 1053 are arranged at one end of the metal plate 1051 in a manner of being connected with each other side-by-side and it may be able to include a connection unit 1054 connecting the metal plate 1051, the first conductive strip 1052 and the second conductive strip with each other.

If the first conductive strip 1052 and the second conductive strip 1053 are connected with the metal plate 1051 via the connection unit 1054 only, the connection connected by the connection unit 1054 may be disconnected. In order to prevent the connection unit from being disconnected, the first slot 1056 and the second slot 1057 can be filled with injected material in case of forming the middle frame 105.

Since the injected material is made of non-conductive material, it is able to prevent the first conductive strip 1052 and the second conductive strip 1053 from being separated from the metal plate 1051 while a function of the slot antenna is maintained.

A main board 185 is mounted on a rear side of the middle frame 105. As mentioned in the foregoing description, the main board 185 consists of a first main board 185a positioned at an upper part of the mobile terminal 100, a second main board 185b positioned at a bottom part of the mobile terminal on the basis of a positon in which a battery 191 is installed, and a connection board 185c positioned between the first main board 185a and the second main board 185b. FIG. 5 shows the second main board 185b positioned at the bottom part of the mobile terminal.

The second main board 185b is connected with a power supply unit via a feeder 1065/1066 to receive power and may be able to emit a signal in a manner of making an electric current flow in the antenna. One end of the first feeder 1065 supplying power to the first slot 1056 is connected to the second main board 185b and another end of the first feeder is connected to the first conductive strip 1052. One end of the second feeder 1066 supplying power to the second slot 1057 is connected to the second main board 185*b* and another end of the second feeder is connected to the second conductive strip 1053.

Impedance of supplied power can be controlled by controlling a length of the feeder 1065/1066. A signal emitted by the first slot 1056 and a signal emitted by the second slot 1057 can be matched with each other by controlling a position to which the conductive strip is connected. The feeder 1065/1066 can further include a capacitor to perform impedance matching. As shown in FIG. 5, in order to secure a prescribed length, the feeder 1065/1066 can be arranged in a manner of passing over a USB port 161 or an ear jack 162.

Such an interface as an ear jack 162, a USB port 161 and the like, a speaker and the like can be positioned at the bottom part of the mobile terminal 100. A signal can be received and transmitted in a manner that the ear jack 162 or the USB port 161 is connected with the second main board 185*b*.

The ear jack 162 includes a hole to which an earphone plug is inserted to transmit an audio signal in order to output sound via such sound equipment as an earphone and a headphone. The ear jack 162 can be positioned at the upper part or a bottom part of the mobile terminal 100. The present embodiment shows that the ear jack is positioned at the bottom part of the mobile terminal.

The USB port 161 is connected with such an external device as a computer, transmits and receives data in wire, and receives power in a manner of being connected with an external power supply. The USB port 161 and the ear jack 162 include a hole to connect with an external device and the hole is formed on a side of a main body. Hence, it is difficult to make a contiguous member to be positioned at a part at which the ear jack 162 or the USB port 161 is positioned. Since the part to which the ear jack 162 or the USB port 161 is positioned corresponds to a path in which power flows or the path in which a signal is moving, the part affects a surrounding electromagnetic field.

Hence, an antenna positioned at the bottom part of the mobile terminal 100 is generally positioned at a side of the position at which the USB port 161 or the ear jack 162 is formed. In case of an antenna including a pattern of being bent multiple times such as a PIFA (planar inverted F antenna), the antenna is arranged in a manner of being bent in a narrow space of the left and the right of the USB port 161 or the ear jack 162 to avoid the USB port 161 or the ear jack 162.

On the contrary, as mentioned in the foregoing description, unlike a different antenna, since a slot antenna is less affected by surrounding, the slot antenna can be arranged in the vicinity of the ear jack 162 and the USB port 161. Hence, as shown in FIG. 5, the ear jack 162 and the USB port 161 can be mounted on a rear side of the middle frame 105.

It may be able to form a boss to which a screw is inserted when the first conductive strip 1052 and the second conductive strip 1053 are combined with a case of the mobile terminal 100. If the boss is formed on a part of the metal plate 1051 of the middle frame 105, a mounting space may be restricted by the boss. Yet, if a position of the boss is located at an outermost of the mobile terminal 100, utilization of an internal space can be enhanced. For instance, if the boss is moved to an end part of the mobile terminal, a resonance space of a speaker, which is positioned at the bottom part of a rear side of the mobile terminal, can be secured.

A stub 1061/1062, which is combined with an end part of the first conductive strip 1052 and an end part of the second conductive strip 1053, is made up of a conductive material and is arranged in a manner of being separated from the metal frame with a prescribed distance. As shown in FIG. 5, the end part can be extended in a manner of being bent in a vertical direction. The stub 1061/1062 can emit a signal of a preferred wavelength in a manner of actually extending a length of a slot.

The stub 1061/1062 can be installed in the inside of a rear case to make the conductive strip to be connected with the rear case when the rear case is combined. In this case, a shape of the stub 1061/1062 is similar to a shape of the rear case.

Figure 6:
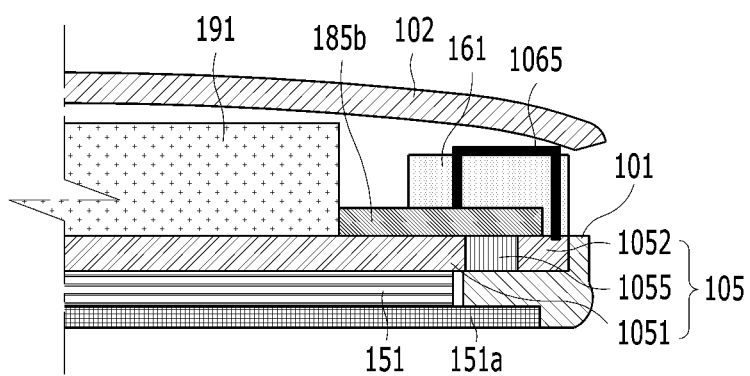
FIG. 6 is a cross-section diagram for an example of a mobile terminal according to the present invention.

FIG. 6 is a cross-section diagram of the aforementioned embodiment. A metal plate 1051 and a conductive strip are installed in a rear side of a front case with which a display unit 151 is combined. A slot, which is formed between the metal plate 1051 and the conductive strip, is combined with a middle frame in a manner of injecting an injected material 1055 into the slot.

A second main board 185*b* and a USB port 161 are mounted on a rear side of the middle frame 105 and a feeder 1065/1066 providing power to a conductive strip is positioned between the conductive strip and the second main board 185*b*.

A rear case can be combined in a manner of covering a battery 191 mounted on the second main board 185*b* and a rear side of the middle frame 105. In case of a removable battery 191, the battery 191 is mounted on a rear side of the rear case after the rear case is combined and a rear cover can be combined with the rear side of the rear case.

Figure 7:
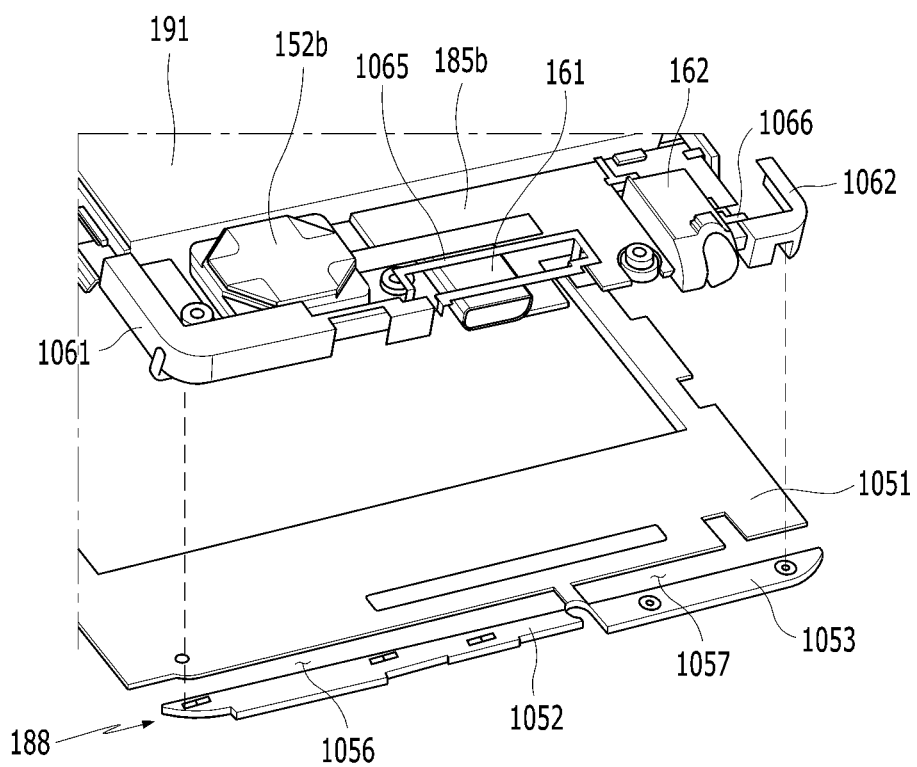
FIG. 7 is a diagram for a different example of an antenna of a mobile terminal according to the present invention.

FIG. 7 is a diagram for a different example of an antenna of a mobile terminal according to the present invention. A conductive strip and a middle frame 105 are not integrated with each other and the conductive strip can be implemented by a strip board 188 including a conductive material.

The strip board 188 can be implemented using a hard printed circuit board or a flexible printed circuit board. In this case, the strip board 188 can be positioned at a rear side of the USB port 161 or the ear jack 162 in a manner of partly bending the strip board.

Although the strip board 188 is connected with a metallic member constructing an exterior of the mobile terminal 100, the strip board does not affect emitting performance of an antenna. Hence, the strip board has less restriction on forming the exterior of the mobile terminal using the metallic member.

Figure 8:
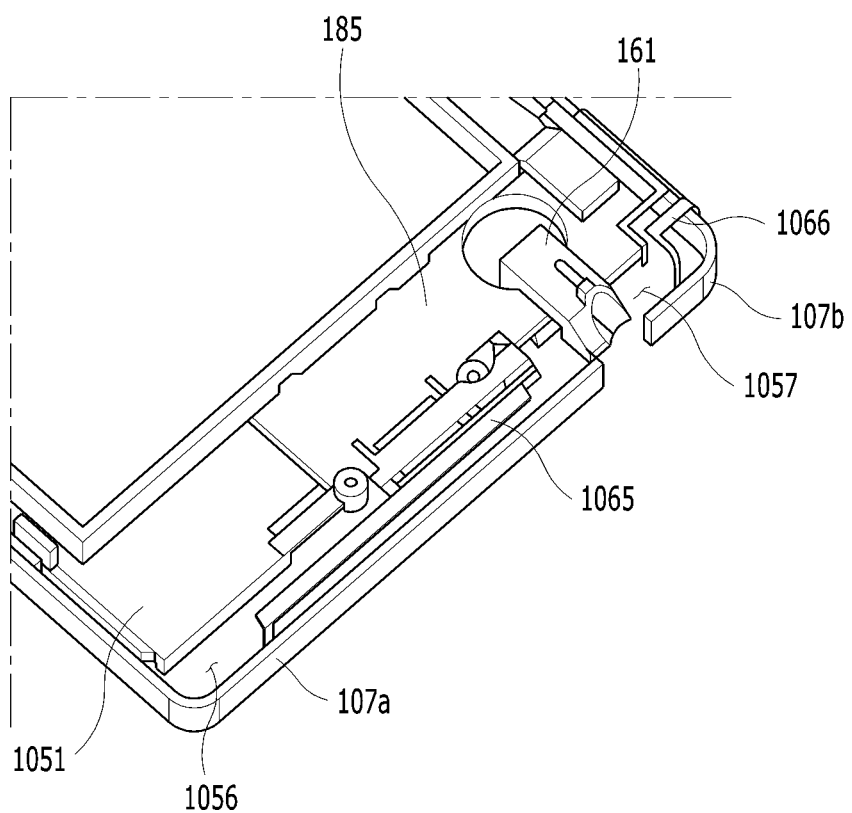
FIG. 8 is a diagram for a further different example of an antenna of a mobile terminal according to the present invention.

FIG. 8 is a diagram for a further different example of an antenna of a mobile terminal according to the present invention. A slot antenna can be implemented using a metal deco 107*a*/107*b* constructing a part of a case as a conductive strip. It may be able to use a front side metal deco constructing a part of front exterior or a metal deco 107*a*/107*b* positioned at a side edge shown in FIG. 8.

In case of using a metal deco 107*a*/107*b* constructing a part of a case as a conductive strip, the metal deco 107*a*/107*b* is connected with a metal plate 1051 of the middle frame 105 and receives power in a manner of being connected with the second main board 185*b*.

As shown in FIG. 8, in order to secure a space to which an ear jack 162 or a USB port 161 is inserted, the metal deco 107*a*/107*b* can be divided into a first conductive strip 107*a* and a second conductive strip. In this case, each of the first conductive strip 107*a* and the second conductive strip can be electrically connected with the metal plate 1051.

Since the conductive strip 107*a*/107*b* is able to be extended to a side of the mobile terminal 100, unlike what is mentioned earlier in the embodiment, it is able to sufficiently secure a length of a slot. Hence, it is able to implement a slot of a sufficient length without a separate stub.

Figure 9:
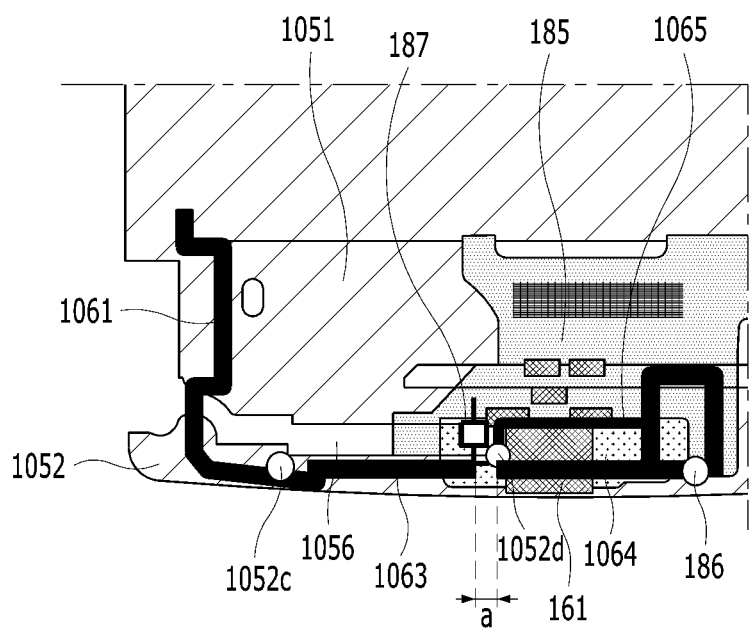
FIG. 9 is a diagram for one embodiment of a first antenna of a mobile terminal according to the present invention.
Figure 10:
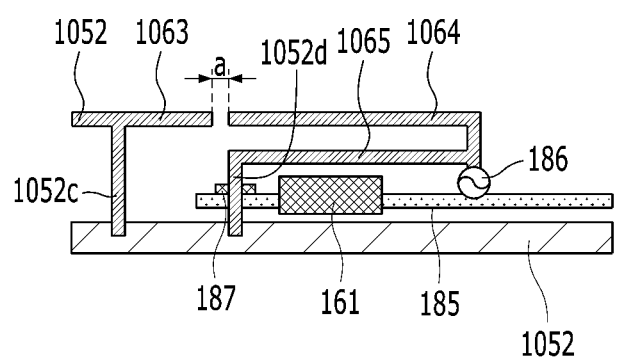
FIG. 10 is a cross-section diagram of FIG. 9.
Figure 11:
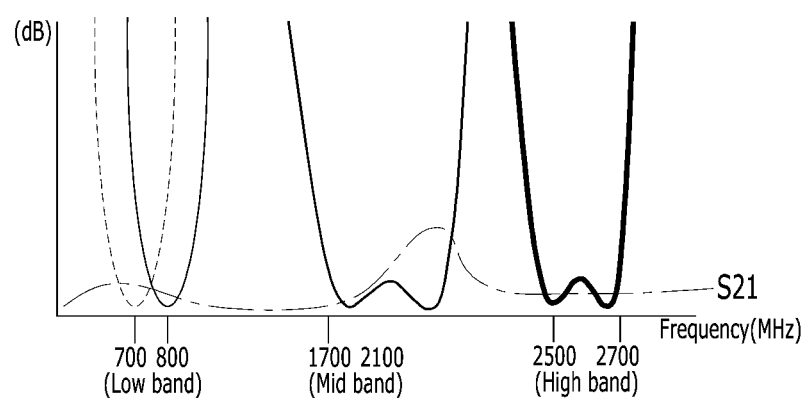
FIG. 11 is a graph showing efficiency of an antenna shown in FIG. 9.

FIG. 9 is a diagram for one embodiment of a first antenna of a mobile terminal according to the present invention. FIG. 10 is a cross-section diagram of FIG. 9. FIG. 11 is a graph showing efficiency of an antenna shown in FIG. 9.

In the foregoing description, a frequency band transmitting and receiving in a first antenna 116 corresponds to a low frequency bandwidth (700 MHz~960 MHz) and a frequency band transmitting and receiving in a second antenna 117 corresponds to a middle frequency bandwidth (1.7 GHz~2.1 GHz). Since some countries perform wireless communication using a high frequency bandwidth (2.6 GHz), it is necessary to have a configuration capable of transmitting and receiving the signal of the high frequency bandwidth.

The first antenna 116 according to the present invention can transmit and receive a signal of a high frequency bandwidth by further including two coupling patterns 1063/1064. As shown in FIG. 10, one end of a first coupling pattern 1063 is connected with a first conductive strip 1052 and another end of the first coupling pattern is extended with the first conductive strip 1052 in a different plane. One end of a second coupling pattern 1064 is connected with a power supply unit 186 of a main board 185 and another end of the second coupling pattern is extended with the first conductive strip 1052 in a different plane.

The first coupling pattern 1063 and the second coupling pattern 1064 are printed or attached on a rear side of a rear case and may be able to maintain a state of being electrically separated from the first conductive strip 1052 by the rear case 102. One end of the first coupling pattern 1063 can be connected with the first conductive strip 1052 in a manner of including a screw 1052c penetrating the rear case 102 or a terminal formed in the inside of the rear case 102. As shown in FIG. 9, the first coupling pattern 1065 can be connected with the first conductive strip 1052 with a path 1052c identical to a first stub 1061.

It is able to transmit and receive a signal of a high frequency bandwidth using the first coupling pattern 1063 and the second coupling pattern 1064. If the first and the second coupling pattern are configured by ¼ length of a wavelength of a signal to be transceived, it causes resonance in a corresponding frequency and the first and the second coupling pattern can be utilized as an antenna.

In this case, as shown in FIG. 11, in order to use a signal of a wider band (2.5 GHz~2.7 GHz), a resonant frequency point can be dispersed into 2. In order to cause resonance at 2 points, the second coupling pattern 1064 can be formed by ¼ length of a wavelength of a first resonant frequency to match with the first resonant frequency (2.5 GHz in the present embodiment). The first coupling pattern 1063 can be formed by ¼ length of a wavelength of a second resonant frequency to match with the second resonant frequency (2.7 GHz in the present embodiment). In this case, the length of the first coupling pattern 1063 and the length of the second coupling pattern 1064 can be configured in opposite way.

In order to perform impedance matching with a signal of a high frequency bandwidth, a first feeder 1065 can also be extended in a first direction from a power supply unit 186 to have a length equal to or greater than ¼ of the wavelength of the first resonant frequency.

Referring to embodiment shown in FIG. 9, one end of the first coupling pattern 1063 is extended in a second direction (right direction in drawing) corresponding to an opposite direction of an opened direction of a first slot and one end of the second coupling pattern 1064 is extended in a first direction (left direction in drawing). Hence, another end of the first coupling pattern 1063 and another end of the second coupling pattern 1064 are positioned in a form of facing each other.

It is able to arrange a space (a) between another end of the first coupling pattern 1063 and another end of the second coupling pattern 1064 to be equal to or less than 5 mm. As shown in FIG. 11, a first antenna can cause resonance in a signal of a high frequency bandwidth (2.6 GHz) by further including the two coupling patterns 1063/1064.

As shown in FIG. 10, a first feeder supplying power to the first antenna 116 can further include a switch 187. The switch 187 can be formed on a main board 185. A first feeder 1065 connected with a power supply unit 186 is connected with a first conductive strip 1052 via the switch 187.

An electric current permitted on the first antenna 116 changes according to whether the switch 187 is turned on or off and is matched with a different frequency band. Referring to FIG. 11, 2 graphs of a low frequency bandwidth are shown. A resonant frequency band may change according to whether the switch 187 is turned on or off.

S21 shown in FIG. 11 corresponds to a graph indicating the extent of influence between the first antenna 116 and the second antenna 117 when the first and the second antenna are working at the same time. Referring to the graph, a size increases in a middle frequency band. Hence, interference causes a problem when the first antenna 116 and the second antenna 117 are working at the same time.

As shown in FIG. 9 and FIG. 10, although a structure of the first antenna 116 in which the first coupling pattern 1063 and the second coupling pattern 1064 are further installed is able to use a signal of a high frequency bandwidth, the structure also has a problem of causing interference in a middle frequency bandwidth corresponding to a resonant frequency band of the second antenna 117. Hence, it is necessary for a country not using the signal of the high frequency bandwidth to improve the structure to a structure capable of minimizing interference of the first antenna 116 and the second antenna 117.

Figure 12:
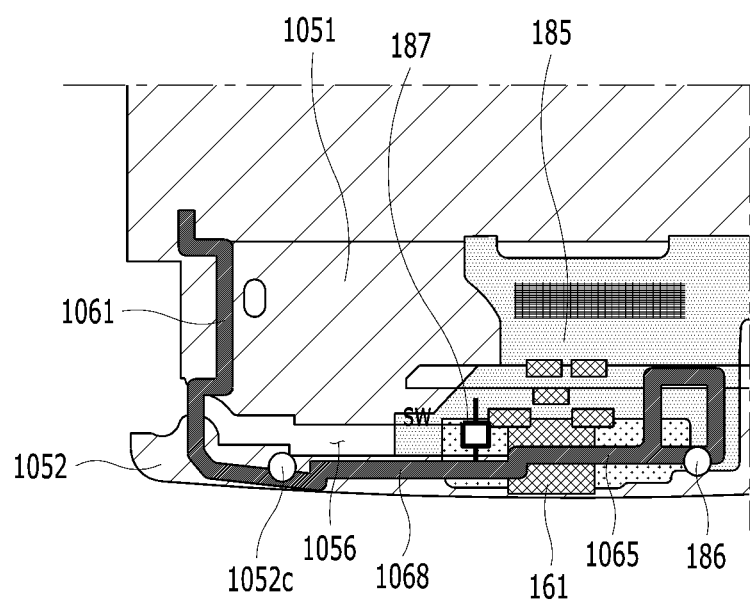
FIG. 12 is a diagram for a different embodiment of a first antenna of a mobile terminal according to the present invention.
Figure 13:
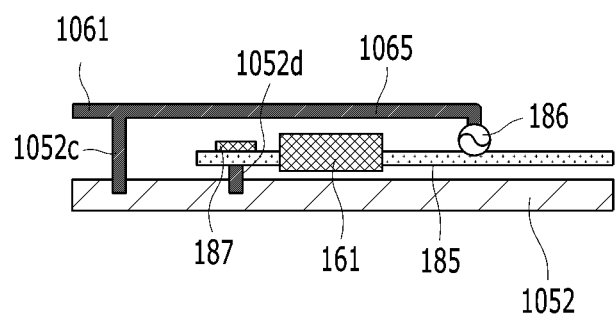
FIG. 13 is a cross-section diagram of FIG. 12.
Figure 14:
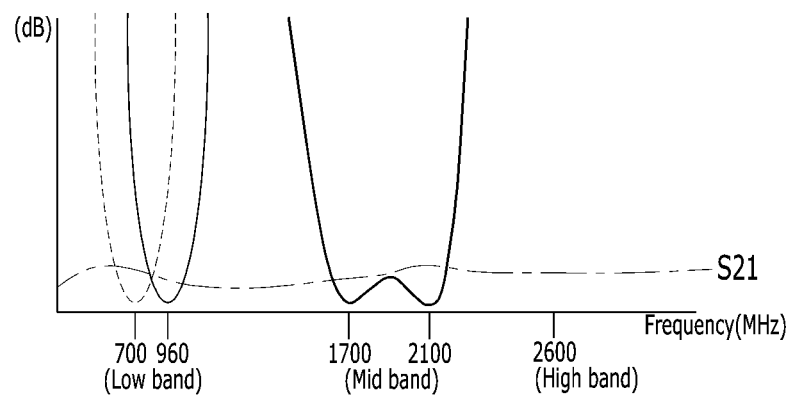
FIG. 14 is a graph showing efficiency of an antenna shown in FIG. 12.

FIG. 12 is a diagram for a different embodiment of a first antenna 116 of a mobile terminal according to the present invention. FIG. 13 is a cross-section diagram of FIG. 12. FIG. 14 is a graph showing efficiency of an antenna shown in FIG. 12.

Referring to the present embodiment, a first feeder 1065, which is arranged by crossing a first slot, is extended in a first direction along a first conductive strip 1052 from a connection unit. The first feeder 1065 is connected with the first conductive strip 1052. As shown in FIG. 13, unlike what is mentioned earlier in the foregoing embodiment, a switch 187 is connected with the first conductive strip 1052 in a different point.

As shown in FIG. 13, a shape of a loop-type antenna is formed by the first conductive strip 1052, the first feeder 1065 and the switch 187. Since the loop antenna has directivity forming an electromagnetic field in a specific direction, the loop antenna less affects surrounding electronic devices.

According to the present embodiment, a first stub 1061 can transmit and receive a signal in a manner of being connected with the first feeder 1065 and directly receiving power.

Referring to FIG. 14, S21 graph indicating interference between 2 antennas 116/117 shows a relatively flat curve. It is able to check that interference is not big although the first antenna 116 and the second antenna 117 are working at the same time.

Figure 15:
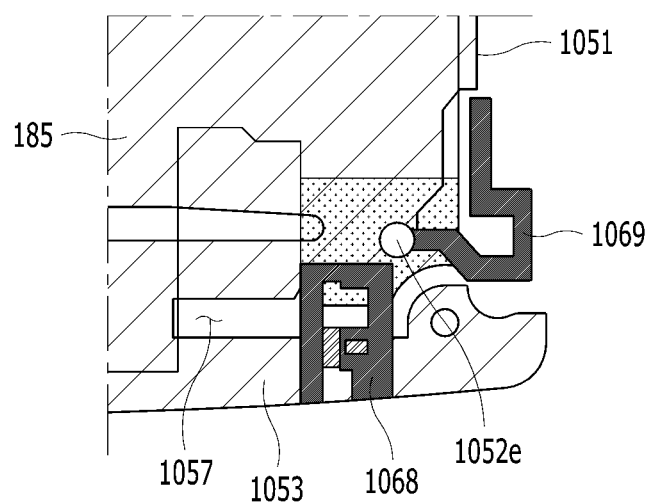
FIG. 15 is a diagram for one embodiment of a second antenna of a mobile terminal according to the present invention.
Figure 16:
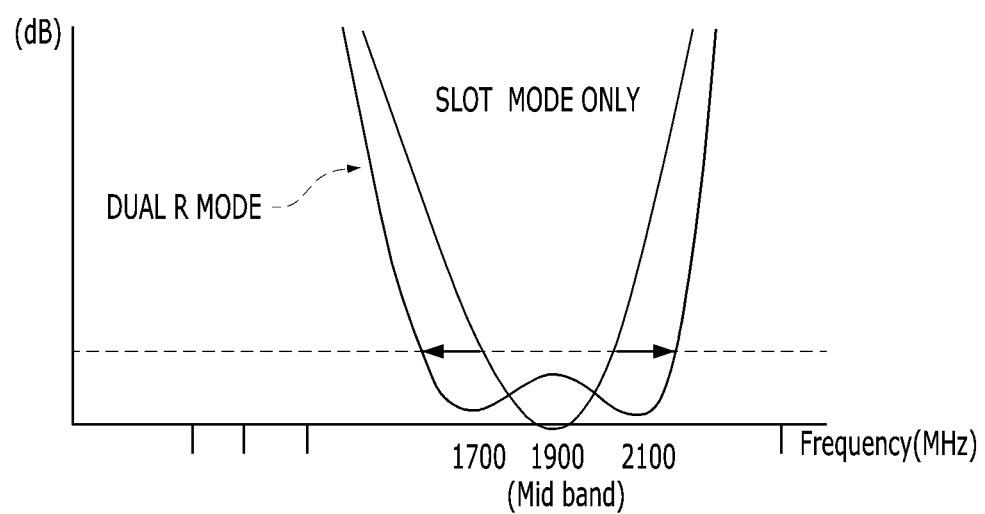
FIG. 16 is a graph showing efficiency of an antenna shown in FIG. 15.

FIG. 15 is a diagram for one embodiment of a second antenna 117 of a mobile terminal according to the present invention and FIG. 16 is a graph showing efficiency of an antenna shown in FIG. 15.

A length of the second antenna 117 is shorter than a length of the first antenna 116 and can be used to transmit and receive a signal of about 2000 Hz. In case of transmitting and receiving a signal using a second slot 1057 only, a frequency band positioned below a horizontal dotted line (valid signal strength) is narrow, since there is a single optimal point (1.9

GHz) in a graph shown in FIG. 16. It is necessary to widen a frequency band capable of being used by the second antenna 117 to use the frequency band for various methods.

One end of a third coupling pattern 1068 is connected with a second conductive strip 1053 of the second antenna 117 and is extended in a manner of being separated from the second conductive strip 1053 and a metal frame with a prescribed distance. The third coupling pattern 1068 can be formed on a rear side of a rear case. One end of the third coupling pattern 1068 is connected with the second conductive strip 1053 in a manner of being positioned at the inside of the rear case 102 via an opening formed on the rear case.

Meanwhile, one end of a fourth coupling pattern 1069 is connected with a mainboard 185 positioned in the vicinity of the second antenna 117 and receives power of a power supply unit via the main board 185. The fourth coupling pattern is arranged in a manner of being separated from the second conductive strip 1053 with a prescribed distance and the fourth coupling pattern can also be formed on the rear side of the rear case 102.

The third coupling pattern 1068 and the fourth coupling pattern 1069 may have ¼ length of a wavelength of a resonant frequency band to change a range of a middle frequency bandwidth. The third coupling pattern 1068 can be formed by ¼ length of a wavelength of a first resonant frequency (1.7 GHz in the present embodiment) and the fourth coupling pattern 1069 can be formed by ¼ length of a wavelength of a second resonant frequency (2.1 GHz in the present embodiment).

Referring to the present embodiment, since a second feeder extended from a main board is not directly connected with the second conductive strip 1053, power is not directly permitted to the second conductive strip 1053. Yet, if an electric current flows through the fourth coupling pattern 1069, a magnetic field is formed and a signal can be transmitted and received via a second slot 1057.

As shown in FIG. 16, if the third coupling pattern 1068 and the fourth coupling pattern 1069 are added, there is an effect of widening a middle frequency bandwidth. Hence, it is able to use all signals belonging to a range ranging from 1700 MHz to 2100 MHz.

As mentioned in the foregoing description, according to at least one or more embodiments of the present invention, since it is able to minimize interference of an antenna caused by a metal part installed in the mobile terminal 100, performance of the antenna can be enhanced.

Moreover, since a metallic material is usable for an exterior of the mobile terminal, restriction on designing the mobile terminal is reduced and design quality can be enhanced. Since there is no restriction on an antenna space due to such an external terminal connection unit 1054 as an ear jack 162 or a USB port 161, degree of freedom of arranging an internal component can be improved.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a main body containing a front side with which a display unit is combined;
   a metal plate mounted on the main body;
   a connection unit coupled to one side of the metal plate;
   a first conductive strip extended from the connection unit in a first direction in a manner of being separated from the metal plate with a prescribed space;
   a second conductive strip extended from the connection unit in a direction opposite to the first conductive strip and positioned in a manner of being separated from the metal plate with a prescribed space;
   a first antenna mounted on the main body, containing a first slot of which first end is opened and second end is closed, wherein the first slot is formed by the first conductive strip, the connection unit and the metal plate;
   a second antenna mounted on the main body containing a second slot of which first end is closed and second end is opened, wherein the second slot is formed by the second conductive strip and the space between the connection unit and the metal plate;
   a power supply unit;
   a first feeder configured to supply power to the first antenna from the power supply unit; and
   a second feeder configured to supply power to the second antenna from the power supply unit.

2. The mobile terminal of claim 1, wherein the metal plate is positioned at a rear side of the display unit and corresponds to a part of a middle frame supporting the display unit.

3. The mobile terminal of claim 2, wherein a middle frame further comprises an injected material integrating the metal plate, the first conductive strip and the second conductive strip with each other in a manner of using an insert injecting scheme on a circumstance of the metal plate, the first conductive strip and the second conductive strip.

4. The mobile terminal of claim 2, further comprising:
   a main board positioned at a rear side of the middle frame; and
   an external terminal connection unit combined with a rear side of the main board,
   wherein at least a part of the first conductive strip and the second conductive strip is positioned at a rear side of the external terminal connection unit.

5. The mobile terminal of claim 1, wherein the metal plate, the connecting unit, the first conductive strip and the second conductive strip are integrated with each other.

6. The mobile terminal of claim 1, wherein the first conductive strip and the second conductive strip correspond to a metal deco exposed to an exterior of the main body of the mobile terminal.

7. The mobile terminal of claim 1, wherein the first slot and the second slot are filled with an electric insulation material.

8. The mobile terminal of claim 1, wherein the first conductive strip and the second conductive strip correspond to a strip board containing a metallic material and wherein the connection unit comprises a screw configured to connect the strip board and a middle frame with each other.

9. The mobile terminal of claim 1, further comprising a stub extended in a manner of being connected with at least one of the first conductive strip and the second conductive strip.

10. The mobile terminal of claim 9, wherein the stub is positioned at a plane different from the first conductive strip or the second conductive strip.

11. The mobile terminal of claim 10, wherein the main body comprises a front case covering a front side and a rear case covering a rear side and
   wherein the stub is formed on the rear side of the rear case and connected with at least one of the first conductive strip and the second conductive strip by penetrating the rear case.

12. The mobile terminal of claim 11, further comprising a screw connected with the stub and combined with the first conductive strip or the second conductive strip by penetrating the rear case.

13. The mobile terminal of claim 9, wherein the first direction and the second direction are horizontal direction of the main body and wherein the stub is extended in a vertical direction along a side of the main body.

14. The mobile terminal of claim 9, wherein the stub is arranged in a manner of being separated from the metal plate and wherein the first slot and the second slot are extended in accordance with a length of the stub.

15. The mobile terminal of claim 9, wherein the first feeder is extended according to the first conductive strip.

16. The mobile terminal of claim 1, further comprising:
   a first coupling pattern connected with the first conductive strip and extended in the second direction; and
   a second coupling pattern positioned in the vicinity of the first antenna, connected with the power supply unit extended in the first direction,
   wherein end of the first coupling pattern and end of the second coupling pattern are closely arranged in a manner of facing with each other.

17. The mobile terminal of claim 1, further comprising a switch configured to be turned on and off in a manner of being connected with the first conductive strip and the switch configured to change a flow of an electric current flowing through the first antenna.

18. The mobile terminal of claim 1, further comprising:
   a third coupling pattern extended from the second conductive strip; and
   a fourth coupling pattern positioned in the vicinity of the second antenna and extended from the power supply unit.

19. The mobile terminal of claim 1, wherein a length of the first slot is longer than a length of the second slot.

* * * * *